Aug. 31, 1948.　　　E. M. SKINNER　　　2,448,400
PROCESS OF ALKYLATION
Filed Jan. 4, 1945
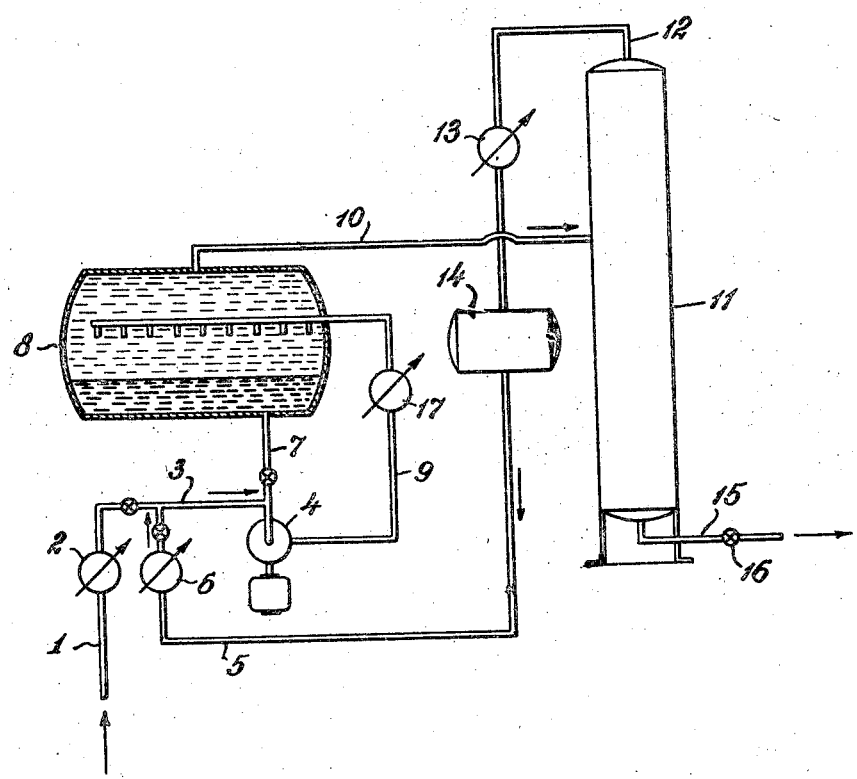
Emory M. Skinner
INVENTOR
BY
ATTORNEY Patented Aug. 31, 1948

2,448,400

UNITED STATES PATENT OFFICE 2,448,400

PROCESS OF ALKYLATION

Emory M. Skinner, Augusta, Kans., assignor to Socony-Vacuum Oil Company, Incorporated, New York, N. Y., a corporation of New York Application January 4, 1945, Serial No. 571,282

7 Claims. (Cl. 260—683.4)

This invention is directed to a process of alkylation wherein isoparaffins are combined with olefins to form hydrocarbon compounds having high anti-knock capability. It is particularly concerned with such processes wherein the alkylation is carried out in the presence of substantially anhydrous hydrofluoric acid as a catalyst.

In such processes a hydrocarbon feed comprising isoparaffin and olefin in proper proportions is brought into a reactor wherein it is contacted with the hydrofluoric acid catalyst and the reactor effluent is permitted to separate into two phases, namely, an upper, or hydrocarbon phase and a lower, or acid phase. The hydrocarbon phase is withdrawn to a fractionating system in which the effluent so withdrawn is freed of admixed acid catalyst, which is returned to the system, is freed of unreacted isoparaffin, which is returned to the system, and is prepared for final use, such preparation involving, as necessary, the removal of residual alkyl fluorides, as by contact with a solid reactant-adsorbent such as bauxite, the removal of hydrocarbons such as butane adventitiously present and unwanted in the product, and possibly the separation of alkylate product into light and heavy fractions for different uses.

It has been customary to hold acid catalyst in such systems at a high titratable acidity coupled with a low content of water and of tar. Water introduced into the system through ineffective drying of hydrocarbon feed, will, of course, collect in the acid catalyst. Olefinic hydrocarbons which, during the course of reaction, are dissolved in the acid catalyst, are not completely removed by reaction and tend to build up in the acid catalyst and due to the activity of the catalyst appear to condense further to higher boiling complex hydrocarbons. The end product of such degradation is a high boiling hydrocarbon complex material known as tar, which tar for the usual commercial purposes and for the purpose of this disclosure is defined as material boiling above 700° F. The decrease in titratable acidity of the acid catalyst is due to the presence in that catalyst of these three materials, that is, water, tar and dissolved hydrocarbons. It is normally considered and recommended that to secure the optimum results from the operation, that the titratable acidity be maintained not lower than about 90%. When so maintained, proper utilization of feed may be obtained with a ratio in the incoming feed of isoparaffin to olefin of about 4 to 1 or higher. The efficiency of operation drops off relatively rapidly when this ratio in the feed, the so-called "external ratio" becomes less. Also when the titratable acidity drops below this level of about 90%, it is noted that there commences to be an increasing amount of alkyl halide carried over with the product, to be removed therefrom, resulting in a substantial loss of acid catalyst from the reactor portion of the system. It is therefore customary to provide that a portion of the acid phase from the settler be withdrawn and passed through an acid regenerator, wherein it is subjected to treatment by distillation permitting the rejection of tar in order that the tar figure in the acid within the system may be held to about 2% by volume maximum.

In general, the operation of regeneration of acid, by distillation, as above outlined, serves to keep the acid free of the three contaminants mentioned, namely, water, tar, and dissolved hydrocarbons. The said regeneration may be carried out continuously, or intermittently, as necessary, and it is usual to withdraw a stream of acid phase from the settler to feed such regeneration, returning the cleaned acid to the system.

It is also customary, when necessary, to dehydrate acid catalyst or to discard a portion of the acid catalyst and replace with new in order that the water content of the acid catalyst within the system shall not exceed about 2% by volume.

This invention has for its object the provision of a process capable of achieving an efficient operation in terms of product produced from feed consumed, capable of operating at lower levels of titratable acidity of acid catalyst, without undue production of alkyl halide, capable of reducing the present difficulties of acid regeneration, capable of achieving these efficiencies of operation with less exacting control and capable of operating upon the whole more economically.

It is based upon the observation that when the feed coming into the alkylation operation contains sulfur, that there is built up within the acid catalyst a hydrocarbon complex high in sulfur and that this hydrocarbon complex apparently acts in the manner of a mutual solvent permitting adequate and efficient reaction at lower concentrations of isoparaffin in the feed, that is, at lower external ratios and at considerably lower values of the titratable acidity of the acid catalyst.

It has been observed in connection with this, that with an acid catalyst having a water content of not over about 2%, and a tar content of not over about 2% with a titratable acidity of about 80%, the remainder of the material in the acid catalyst phase being largely the high sulfur complex hydrocarbons spoken of, efficient conversion to alkylate could be had with an external ratio of 3 to 1 or lower. Obviously this is of importance.

The exact nature and the origin of these complex hydrocarbon materials of high sulfur content is not known. In physical terms they are materials boiling between about 150° F. and about 700° F. and have a sulfur content ranging from about 10% to about 25% by weight. The sulfur content is chiefly concentrated in the portion boiling below about 500° F. It is believed that they are the result of condensation of hydrocarbons containing various forms of sulfur. Whatever their origin and nature may be, it is certain that they have permitted, when present in the acid catalyst, of an operation considerably different in kind from that which it has heretofore been felt necessary to practice. Not only may high conversion efficiencies be achieved with catalyst having a titratable acidity of around 80% or so, but this high conversion efficiency may be achieved at considerably lower titratable acidities, diminishing somewhat, of course, but still of profitable nature at titratable acidities of about 50% or so, corresponding to the maximum solubility of these sulfur oils. The external ratio may similarly be varied over a rather wide range and efficient conversion be effected with considerably lower proportions of isoparaffin than usually felt necessary. Commercially efficient conversion can be had even at ratios of 2½ isoparaffin to 1 olefin or less. It has been noted that in all of these operations there does exist a very important difference between this process characterized by low titratable acidity due to the presence of these sulfur bearing hydrocarbons and the process heretofore practiced, that when the titratable acidity of the acid catalyst drops, there is no corresponding increase in alkyl halide material carried away from the reaction system in the hydrocarbon phase effluent therefrom. Of course, at the upper end of the range of titratable acidities, titratable acidities of about 85% and above, the proportionate amount of the sulfur containing hydrocarbon complexes present in the acid catalyst becomes so small that the operation changes over into one which has the characteristics of the normally considered operation in which the hydrocarbons dissolved in the acid catalyst are low in sulfur content.

While the proces herein set forth will be capable of use in the conventional HF alkylation setup, comprising, serially, the usual contactor, settler, acid stripper, deisobutanizer, and internal isobutane recycle therefrom, such as shown in my copending application Serial Number 480,429, filed March 25, 1943, and now abandoned, the process has several features which enable it to be carried out in many cases in a relatively simple mechanical setup, as will be understood from reference to the drawings attached to and made a part of this specification, in which the single diagrammatic figure shows the essential apparatus, parts and arrangement necessary for the conduct of alkylation in these circumstances according to the process herein disclosed.

In this drawing the feed mixture entering through pipe 1 is chilled in cooler 2 and passes through pipe 3 into the suction side of a pump 4. Isoparaffin materials recycled from within the system through pipe 5 are chilled in cooler 6 and pass into pipe 3. Pump 4 withdraws acid phase material through pipe 7 from settler 8. This acid phase material or acid catalyst complex is admixed with the incoming feed and the recycled isoparaffin where the reaction is effected through the mixing afforded by pump 4 and within the following flow line 9 which may, if desired, be fitted with suitable turbulence-providing devices. The pre-cooling of the feed and recycle is to be carried out to such an extent as to balance the heat of reaction without producing in the effluent stream from pipe 9 a temperature greater than can be handled under the conditions contemplated. Usually this temperature is dictated by the design of the settler 8 and will normally not exceed about 90° F. At low, internal recycling rates the cooling provided at 6 and 2 might well be insufficient, and in such cases an aftercooler, such as 17, may be used. Effluent material delivered from pipe 9 into settler 8 divides into hydrocarbon phase and acid catalyst phase, the acid catalyst phase, of course, being a complex material consisting of acid catalyst and, dissolved therein, the regulated amounts of water, tar and sulfur containing hydrocarbon complexes. This acid phase material, of course, returns to reaction. The hydrocarbon phase material taken overhead through pipe 10 is fed into a fractionator 11 which is so operated as to produce the action both of the conventional acid stripper and of the conventional deisobutanizer. In other words, if the original feed were isobutane and butene to be alkylated to produce iso-octane, the fractionator 11 would be so operated as to pass overhead all of the acid catalyst and isobutane coming out of the settler in admixture with the product, and that acid and isobutane passing overhead through pipe 12, to be cooled at 13 and collected at 14, is returned to the reaction step through pipe 5. Product is taken off the bottom of fractionator 11 through pipe 15. Of course, such butane or other hydrocarbon which was present in the incoming feed at pipe 1 and which is not desired to be present in the final product must be removed and also if it is desired to split the product into a light and heavy alkylate, that must be done. Both of these processes, however, are thoroughly normal in nature and do not bear any characteristics imposed upon them by the process steps herein disclosed. It is however to be noted that this product leaving the system through pipe 15 is quite low in alkyl fluoride content and while it is usual to pass it through an adsorbent such as bauxite for complete safety, this step would be done for purposes of insurance rather than necessity.

Due to the nature of the acid catalyst hydrocarbon complex mixture used in this proposition, several features become apparent in this operation. One of the more striking ones is that the complex catalyst mixture frequently does not tend to build up tar at a particularly heavy rate and so usually provisions need be made only for relatively intermittent regeneration of the catalyst.

A further feature is that due to the enhanced reactivity of the catalyst, there appears to be no need for intricate or complex contactors such as those normally used.

A further feature is that the sulfur containing hydrocarbon complex appears to be capable of acting as an inhibitor of the corrosion of hydrofluoric acid and consequently cheaper construction is possible. Also, due to the lower production of alkyl fluorides and the lower concentration level of these materials, mechanical problems in valves, pumps, etc., are materially reduced.

Another valuable feature is that due to the known preferential solvent capability which hydrofluoric acid has for sulfur containing hydrocarbons, as soon as these sulfur containing hydrocarbons commence to be built up in the system, the acid catalyst phase tends toward a condition of equilibrium wherein non-sulfur containing hydrocarbon complexes are rejected from the acid phase and pass out of the system with the hydrocarbon phase. This provides an important characterizing feature in that it was these non-sulfur containing hydrocarbon complexes formerly built up and dissolved in the hydrofluoric acid, which, upon further condensation gave rise to the tar produced. When sulfur bearing compounds are present, the non-sulfur bearing hydrocarbons get considerably less chance to remain with the acid catalyst for a sufficient length of time to become further polymerized into tar. It is also possible to operate the entire system under a pressure sufficiently elevated in the settler 8 and reduced as by valve 16 so as to require no pump or other moving element in contact with the acid containing portions of the systems other than the single pump 4. Economies arising from this are also obvious.

I claim:

1. A process of alkylation comprising reacting an isoparaffin and an olefin in the presence of a complex hydrofluoric acid catalyst of titratable acidity of at least 50% and not greater than about 85%, containing not over about 2% of tar and not over about 2% of water, the remainder of the catalyst complex being composed substantially of hydrocarbons of high sulfur content, which hydrocarbons boil substantially between about 150° F. and about 700° F.

2. A process of alkylation comprising reacting an isoparaffin and an olefin, the molecular proportion of isoparaffin to olefin being at least about two to one and less than four to one, in the presence of a complex hydrofluoric acid catalyst of titratable acidity of at least 50% and not greater than about 85%, containing not over about 2% of tar and not over about 2% of water, the remainder of the catalyst complex being composed substantially of hydrocarbons of high sulfur content, which hydrocarbons boil substantially between about 150° F. and about 700° F.

3. A process of alkylation comprising reacting an isoparaffin and an olefin in the presence of a complex hydrofluoric acid catalyst of titratable acidity of at least 50% and not greater than about 85%, containing not over about 2% of tar and not over about 2% of water, the remainder of the catalyst complex being composed substantially of hydrocarbons of high sulfur content, having at least about 10% of sulfur by weight, which hydrocarbons boil substantially between about 150° F. and about 700° F.

4. A process for the alkylation of isoparaffins with olefins comprising feeding into a reactor a mixture of isoparaffin and of olefin hydrocarbons which mixture contains some sulfur, feeding to the reactor a stream of recycled isoparaffin constituents, feeding to the reactor a complex hydrofluoric acid catalyst mixture, removing an effluent stream from the reactor and separating it into a hydrocarbon phase and an acid phase, removing and distilling the hydrocarbon phase to separate from it acid and unreacted isoparaffin constituents for return to the system, recycling the acid phase to the reactor, periodically diverting a portion of the acid phase and reducing the tar content thereof and the water content thereof, while permitting sulfur containing hydrocarbons boiling between about 150° and about 700° F. to remain therein, the periodic catalyst cleanup being so proportioned as to maintain the catalyst within the system at about 2% of tar, 2% of water, and a titratable acidity of from about 50% to not over about 85%.

5. A process of alkylation comprising reacting an isoparaffin of not over 5 carbon atoms with an olefin of not over 5 carbon atoms, in the presence of a complex hydrofluoric acid catalyst of titratable acidity of at least 50% and not greater than about 85%, containing not over about 2% of tar and not over about 2% of water, the remainder of the catalyst complex being composed substantially of hydrocarbons of high sulfur content, which hydrocarbons boil substantially between about 150° F. and about 700° F.

6. A process of alkylation comprising reacting an isobutane and butylene in the presence of a complex hydrofluoric acid catalyst of titratable acidity of at least 50% and not greater than about 85%, containing not over about 2% of tar and not over about 2% of water, the remainder of the catalyst complex being composed substantially of hydrocarbons of high sulfur content, which hydrocarbons boil substantially between about 150° F. and about 700° F.

7. A process for the alkylation of isoparaffins with olefins comprising feeding into a reactor a mixture of isobutane and butylene, which mixture contains some sulfur, feeding to the reactor a stream of recycled isoparaffin constituents, feeding to the reactor a complex hydrofluoric acid catalyst mixture, removing an effluent stream from the reactor and separating it into a hydrocarbon phase and an acid phase, removing and distilling the hydrocarbon phase to separate from it acid and unreacted isoparaffin constituents for return to the system, recycling the acid phase to the reactor, periodically diverting a portion of the acid phase and reducing the tar content thereof and the water content thereof, while permitting sulfur containing hydrocarbons boiling between about 150° F. and about 700° F. to remain therein, the periodic catalyst cleanup being so proportioned as to maintain the catalyst within the system at about 2% of tar, 2% of water, and a titratable acidity of from about 50% to not over about 85%.

EMORY M. SKINNER.

REFERENCES CITED

The following references are of record in the file of this patent:

UNITED STATES PATENTS

| Number | Name | Date |
| --- | --- | --- |
| 2,320,629 | Matuszak | June 1, 1943 |
| 2,371,341 | Matuszak | Mar. 13, 1945 |
| 2,378,636 | Iverson | June 19, 1945 |
| 2,382,899 | Newman | Aug. 14, 1945 |
| 2,388,918 | Iverson | Nov. 13, 1945 |
| 2,388,919 | Iverson | Nov. 13, 1945 |
| 2,404,393 | Mayland | July 23, 1946 |
| 2,414,626 | Allen | Jan. 21, 1947 |

FOREIGN PATENTS

| Number | Country | Date |
| --- | --- | --- |
| 117,359 | Australia | Aug. 5, 1943 |

OTHER REFERENCES

National Pet. News—Tech. Sec., Mar. 1, 1944, pages R-146, R-148, R-150, R-151, R-154, and R-155.